United States Patent [19]
Hatanaka

[11] Patent Number: 6,089,024
[45] Date of Patent: Jul. 18, 2000

[54] STEAM-AUGMENTED GAS TURBINE

[75] Inventor: Takefumi Hatanaka, Tokyo, Japan

[73] Assignee: Elson Corporation, Tokyo, Japan

[21] Appl. No.: 09/199,921

[22] Filed: Nov. 25, 1998

[51] Int. Cl.[7] .................................................. F01K 25/00
[52] U.S. Cl. ...................... 60/671; 60/39.05; 60/39.182; 60/39.55
[58] Field of Search ............................... 60/651, 653, 671, 60/676, 679, 39.05, 39.55, 39.181, 39.182, 39.183

[56] References Cited

U.S. PATENT DOCUMENTS

| | | | |
|---|---|---|---|
| 4,509,324 | 4/1985 | Urbach et al. | 60/39.55 X |
| 4,785,622 | 11/1988 | Plumley et al. | 60/39.55 X |
| 4,823,546 | 4/1989 | Cheng | 60/39.05 X |
| 4,841,721 | 6/1989 | Patton et al. | 60/39.05 |
| 5,329,758 | 7/1994 | Urbach et al. | |
| 5,564,269 | 10/1996 | Briesch. | |

*Primary Examiner*—Hoang Nguyen
*Attorney, Agent, or Firm*—Jordan and Hamburg LLP

[57] ABSTRACT

A steam-augmented gas turbine comprises a direct contact steam generation combustor for generating a first working fluid composed of steam and combustion product, a first turbine for receiving and expanding the first working fluid to generate a first power output and discharging an exhaust product, a heat recovery evaporator for receiving the exhaust product to generate a second working fluid from an organic mixture liquid, a first feed pump for feeding the feed water to the combustor, a second feed pump for feeding the organic mixture liquid under pressure to the evaporator, a second turbine for receiving and expanding the second working fluid to provide an expanded organic mixture, and a condensor for receiving and condensing the expanded organic mixture to provide the organic mixture liquid to be fed to the second feed pump.

14 Claims, 8 Drawing Sheets

STEAM-AUGMENTED GAS TURBINE

BACKGROUND OF THE INVENTION

1. Field of the Invention

The present invention relates to gas turbines and more particularly to steam-augmented gas turbines.

2. Description of the Related Art

Many heat-recovery schemes have been proposed in prior art. For example, the so-called "combined cycle", in widespread use today, is an arrangement that improves efficiency with the use of a steam cycle in series with a combustion-turbine cycle. Heat contained in a hot gas leaving an expander is recovered to generate high-pressure steam, which in turn drives a steam turbine. A high efficiency is attained in the combined cycle when the hot gas entering the expander is around 1260° C. (2300° F.).

Another scheme in limited use today is the so-called steam-injected cycle in which high-pressure steam is injected into a combustor. U.S. Pat. No. 5,329,758 to Urbach et al. discloses a steam-augmented gas turbine (SAGT) engine employing a heat recovery steam generator (HRSG). In order to obtain maximum efficiency of the steam turbine, it is desirable to generate steam at a high temperature and pressure. However, the HRSG limits the quantity of the steam generated because of a heat recovery limitation. More specifically, the HRSG operates at greatly reduced efficiency, since the recovery liquid approaches and exceeds it's saturation temperature and pressure causing the temperature difference between the exhaust gases and the recovery liquid to be minimized. This phenomenon limits the maximum achievable boiler pressure and the minimum achievable exhaust gas temperature putting a limit to the possible improvement in efficiency.

U.S. Pat. No. 5,564,269 to Briesch proposes to overcome the limitation in thermal efficiency of the SAGT engine by utilizing an improved HRSG that generates steam at multiple pressure levels by employing a separate evaporator at each pressure level. Although this system increases the recovery of heat from the exhaust gas, the HRSG is complex, involving large sized steam drums, a large duct, etc., and require a considerable capital investment.

Despite the potential advantages of the Urbach et al. '758 and Briesch '269 systems none of these systems are cost effective, compact in structure and high in thermal efficiency. Firstly, the turbine input temperatures are maintained at high values in the range of 1204° to 1370° C. (2200°–2500° F.) in order to obtain the maximum thermal efficiency and such higher input temperatures would require much more expensive material for the construction of the turbine blades and the heat recovery boiler. At high turbine input temperatures, secondly, blade cooling is necessary and the turbine structure becomes complex. In spite of the high input temperatures, further, the thermal efficiency of such engines does not increase because the air compressor should compress more air than is needed for combustion to provide excess air to be used for cooling the blades. The energy used to compress the excess air is a parasitic load on the turbine and this load has a major impact on the thermal efficiency. For example, one-half to two-thirds of the power produced by the turbine is used to drive the air compressor, thus leaving only about one-third to one-half of the power available for useful work. Thirdly, the SAGT systems discussed above consume large amount of water since the exhaust gases containing a large amount of steam are rejected from the HRSG without recycling. Thus, in the SAGT system employed in the ship disclosed in Urbach et al. '758, a large scale water purification system composed of an expensive reverse osmosis desalinator is required and the water purification system occupies a large space in a limited space of the ship. Further, since the output shaft of the turbine rotates at an extremely high speed, the SAGT systems are equipped with a large and heavy reduction gear unit which shares a relatively large space in a limited area of the ship.

SUMMARY OF THE INVENTION

Accordingly, it is an object of the present invention to provide a steam-augmented gas turbine engine which is simple in structure, high in thermal efficiency and low in manufacturing cost.

Another object of the present invention is to provide a high-power-density gas-turbine engine that converts a heat recovery energy into working fluid to increase shaft power to improve thermal efficiency.

Another object of the present invention is to provide a high efficiency gas turbine power plant in which steam contained in hot exhaust gas is recycled to reduce a remarkable amount of water to be newly added to the system.

Another object of the present invention is to provide a compact gas turbine system which permits the use of an extremely small size water purification system to prepare feed water especially in naval application.

A further object of the present invention is to provide a compact gas turbine system which permit the use of an extremely compact reduction gear unit.

A still further object of the present invention is to provide an improved, less costly gas turbine power plant for use on ships as well as land-based operations.

Briefly, this object, as well as other objects of the current invention, is accomplished by a high efficiency gas turbine which is constituted so as to generate high-pressure working fluid composed of organic material with the efficient use of low grade heat recovery energy which is not used for generating steam. Namely, the heat recovery energy is mostly converted to a mechanical power in a direct fashion. Thus, secondly, the so-called "pinch effect" is satisfactorily solved to increase a thermal efficiency. Secondly, the gas turbine is equipped with steam generation type combustors to which feed water is directly injected to form steam which is mixed with combustion gas to provide high-pressure mixture composed of steam and combustion gas. The steam serves as diluent to lower the turbine input temperature while increasing the pressure of the mixture whereby the thermal efficiency is further improved. Thirdly, steam contained in hot gas leaving a turbine is repetitively recycled to be used as feed water which is supplied to the combustors and only dry exhaust gas is rejected from the system, thereby allowing the use of an extremely compact water purification system.

DESCRIPTION OF THE PREFERRED EMBODIMENT

Figure 1:
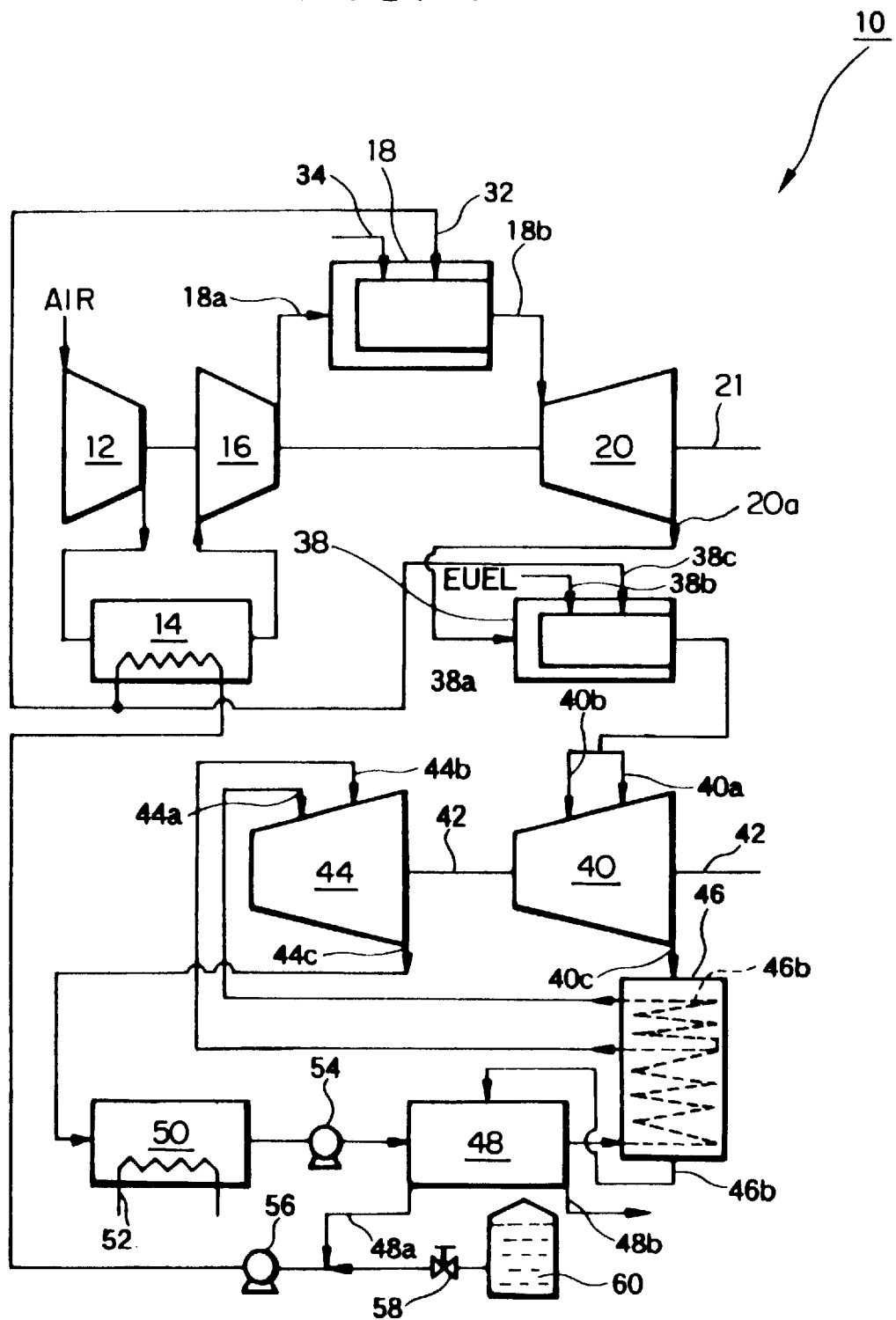
FIG. 1 is a schematic diagram of a gas turbine according to the present invention.

Referring to the drawings, wherein like reference numerals refer to like elements, there is shown in FIG. 1 a high efficiency gas turbine 10 composed of a SAGT engine suitable for driving an electric generator power plant or providing shaft power for other requirements such as shipboard propulsion system. The gas turbine 10 comprises a first compressor 12. The first compressor 12 compresses ambient air to provide compressed air in the range of 149°–204° C. (300°–400° F.) to an intercooler 14. The intercooler 14 cools the compressed air into approximately 21°–121° C. (70°–250° F.) temperature range and the cooled compressed air is fed to a second compressor 16. The second compressor 16 compresses the air into 149°–260° C. (300°–500° F.) and the compressed air is delivered to a first steam generation type combustor 18.

Figure 2:
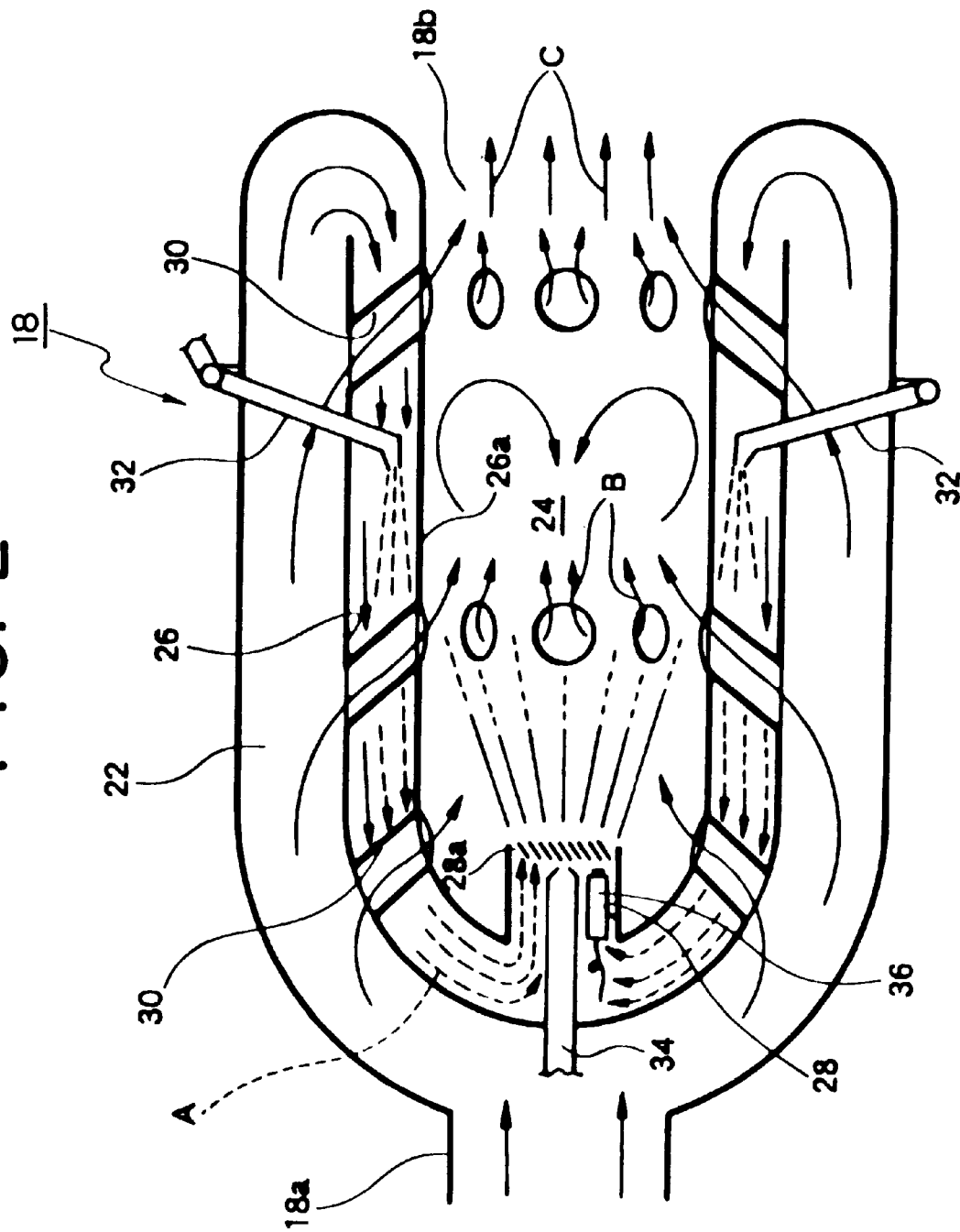
FIG. 2 is a schematic sectional view of a high pressure combustor.

In FIG. 2, the combustor 18 includes an inlet 18a connected to the second compressor 16, an outlet 18b connected to a compressor turbine 20, a compressed air intake chamber 22, a combustion chamber 24, an annular, direct contact steam generator section 26 disposed between the compressed air intake chamber 22 and the combustion chamber 24 to generate a steam/air mixture, and a mixing chamber 28 formed between the direct contact steam generator section 26 and the combustion chamber 24 to form a combined mixture of fuel and steam/air mixture. The direct contact steam generator section 26 has its upstream end communicating with the compressed air intake chamber 22, an inner, reactor wall 26a facing the combustion chamber 26a, a plurality of air passages 30 to directly introduce the compressed air from the intake chamber 22 into the combustion chamber 24, and a plurality of water spray nozzles 32 to spray feed water droplets which are in direct contact with the compressed air and a surface of the reactor wall 26a to cause high pressure steam to be generated. The spray nozzles 32 is supplied with feed water in a manner as will be described later. The compressed air is delivered to the direct contact steam generator section 26. In this instance, since the reactor wall 26a is heated to a high temperature, sprayed water droplets formed by the spray nozzles 32 are converted to steam in direct contact with the high temperature compressed air and the high temperature reactor wall 26a. The steam is mixed with the compressed air to form the steam/air mixture A in the steam generator section 26. The steam/air mixture is further mixed with the fuel 34 to form the combined mixture which passes through swirling buffle plates 28a into the combustion chamber 24. At this instant, the combined mixture is ignited by an igniter 36 and combusted to generate a high pressure combustion gas composed of high pressure steam and combustion products as a first working fluid C having the temperature in the range of approximately 871° C. (1600° F.). Compressed air and fuel are contacted within the combustor 18 such that combustion is essentially complete prior to the injection of the feed water into the direct contact steam generator section 26. This is achieved by specific relative arrangement among the swirler 28a, the air passages 30 and the combustion chamber 24. The percentage of water (i.e., with respect to air) injected into the combustor will be about 50%. The direct contact steam generator section 26 contributes to produce maximum efficiency at a much higher pressure ratio than conventional gas turbines, reducing the amount of excess air that must be compressed per unit of fuel combusted. The maximum temperature is chosen as 871° C. (1600° F.) in order to utilize state of the art gas turbine technology, while reducing NOx pollutants to enable the plant to satisfy local air pollution requirements.

Turning to FIG. 1, the first working fluid discharged from the combustor 18 is then expanded in a compressor turbine 20 down to a lower pressure to produce an expanded combustion product. In the preferred embodiment, the temperature of the expanded gas 20a exhausted from the turbine 20 is in the range of approximately 550° C. (1022° F.) This expansion produces power in a turbine shaft 21 that drive the compressors 12 and 16. The excess power not consumed by the compressors 12 and 16 drives an electric generator (not shown), thereby generating electrical power. As a result of the injection of the feed water to generate the steam in the combustor 18, the mass flow rate of the working fluid flowing through the turbine 20 is increased. Consequently, the power produced in the turbine 20 is considerably greater than it would be if only the air 18a from the compressor 16 were expanded.

The expanded combustion product 20a is then supplied to an inlet 38a of a second direct contact steam generation type combustor 38 which has the same construction as the first combustor 18 shown in FIG. 2. The second combustor 38 has a fuel nozzle 38b and water injection spray nozzles 38c and produces a second working fluid composed of combustion products and steam in the range of approximately 871° C. (1600° F.) The second working fluid discharged from the second combustor 38 is then expanded to a lower pressure by a first expansion turbine 40 whose output shaft 42 is connected to a second expansion turbine 44. In the preferred embodiment, the temperature of the expanded gas 40c is in the range of approximately 316°–371° C. (600°–700° F.). This expansion produces power in the output shaft 42 to give a drive power to the electric generator or a propulsion system (not shown).

The expanded gas product 40c enters a heat recovery evaporator (HRE) 46. After leaving the HRE 46, the exhaust gas 46b is further cooled in a regenerator 48 and is ultimately vented to atmosphere therefrom. In the preferred embodiment, the heat transfer in the HRE reduces the temperature of the exhaust gas 46b into approximately the 110°–150° C. (230°–300° F.) temperature range.

In the preferred embodiment, the HRE 46 receives organic mixture liquid composed of 5 to 25 weight percentage of ammonium and 75 to 95 weight percentage of methanol. More preferably, the organic mixture is composed of a methanol containing 12 weight percentage of ammonium. In this example, the organic mixture has a low boiling point at approximately 50° C. and provides pressure levels of 40 bars at 175° C. (347° F.), 100 bars at 215° C. (419° F.), 500 bars at 280° C. (536° F.) and 800 bars at 300° C. (572° F.). This organic mixture has an extremely low melting point at approximately –85° C. and provides high pressure levels at relatively low heat energy levels, respectively, to thereby improve the conversion rate between the low grade heat energy and the mechanical power. Thus, the HRE 46 generates a third working fluid of a high pressure in the range of 500 bars at the temperature of approximately 280° C. The third working fluid is also supplied to inlets 44a and 44b of a second expansion turbine 44 and is expanded thereby. This expansion produces additional power in the output shaft 42. The expanded gas 44c enters a condensor 50, to which a coolant 52 is supplied to cool the expanded gas 44c for thereby producing the liquid of organic mixture at the temperature in the range of approximately 45° C. (113° F.). The organic liquid is then pressurized by a feed pump 54 and directed to the regenerator 48. The regenerator 48 cools the expanded gas 46b to the temperature below 95° C. (203° F.) so that steam contained in the expanded gas 46b is converted to feed water 48a. The feed water 48a is combined with water from a feed tank 60 when a control valve 58 is opened and is pressurized by a feed pump 56. The dry hot gas 48b is rejected from the regenerator 48 to atmosphere. The organic liquid is heated to approximately 75° C. (167° F.) in the regenerator 48 and fed to the HRE 46. The pressurized feed water is delivered to an intercooler 14 and preheated thereby to be fed to the first and second combustors 18 and 38. The intercooler 14 allows the compressed air from the first compressor 12 to be cooled and delivers it to the second stage compressor 16.

Figure 3:
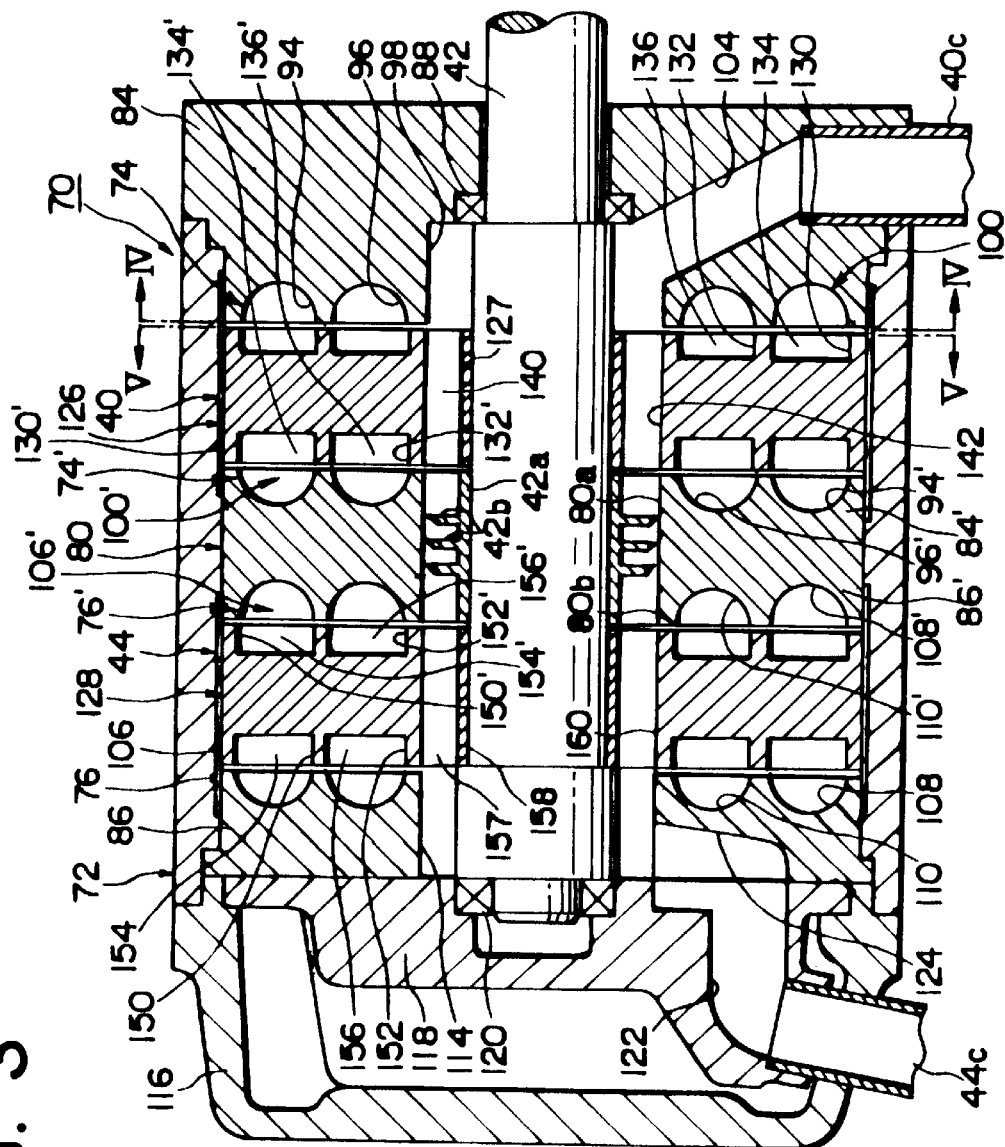
FIG. 3 is a schematic sectional view of a hybrid gas turbine.

FIG. 3 shows a schematic sectional view of a hybrid gas turbine engine 70 incorporating the first and second expansion turbines 40 and 44 of FIG. 1. The hybrid gas turbine engine 70 comprises a turbine housing 72. The turbine housing 72 has first injection nozzles 74 and 74' communicating with the inlets 40a and 40b, respectively, of the first expansion turbine 40, and second injection nozzles 76 and 76' communicating with the inlets 44a and 44b, respectively, of the second expansion turbine 44. Further, the turbine housing 72 has a first pair of stators 84 and 84' of the first expansion turbine 40, and a second pair of stators 86 and 86' of the second power turbine 44. The stator 84' and 86' are formed on both sides of an intermediate, single stator disk 80, but may be formed on individual stator disk.

Figure 4:
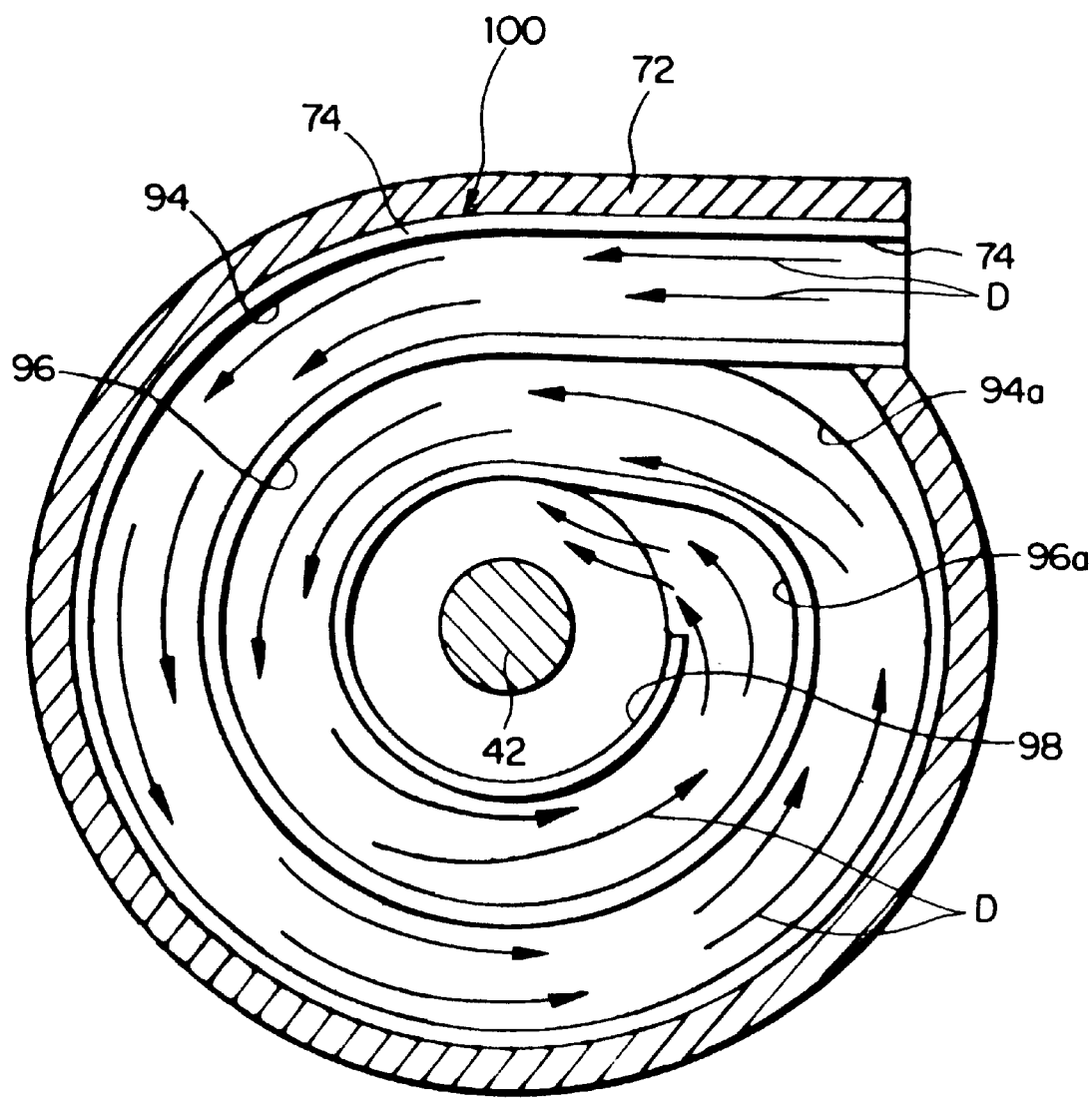
FIG. 4 is a plan view of a stator taken on line IV—IV of FIG. 3.

In FIG. 3, the stator 84 serves as a frame or an end plate which carries a bearing 88 to rotatably support the output shaft 42. In a large power plant, the stator 84 maybe separated from the frame, if desired. As shown in FIGS. 3 and 4, the stator 84 comprises a first annular flow passage 94 having its inlet communicating with the nozzle 74, a second annular flow passage 96 having its inlet connected to another end of the first annular flow passage 94 through an intermediate flow passage 94a, and a central opening 98 connected to the second annular flow passage 96 through an intermediate flow passage 96a. The central opening 98 communicates with the outlet 40c via an exhaust passage 104. The first and second annular flow passages 94 and 96 are formed on a radial surface of the stator 84 and serve as a high speed circular jet stream generation means 100 which generates a high speed circular jet stream on the radial surface of the stator 84.

As shown in FIG. 3, the stator 74' also has on its radial surface formed with a high speed circular jet stream generation means 100' communicating with the nozzle 74'. The jet stream generation means 100' comprises first and second annular flow passages 94' and 96', and a central opening 80a to which a terminal end of the second annular flow passage 96' is connected.

In FIG. 3, the second pair of stators 86 and 86' similarly comprise high speed circular jet stream generation means 106 and 106', respectively, communicating with the nozzles 76 and 76', respectively. The jet stream generation means 106 comprises first and second annular flow passages 108 and 110 formed on a radial surface of the stator 86 so as to communicate with each other. The second flow passage 110 communicate with a central opening 114 which in turn communicates with the outlet 44c of the second power turbine 44 via exhaust passages 122 and 124. Thus, the expanded gas leaving the first and second jet stream generation means 106 and 106' are exhausted from the outlet 44c for the next stage.

As shown in FIG. 3, first and second turbine rotors 126 and 128 are rotatably disposed in the turbine housing 72 in opposed relationship to the first pair of stators 84 and 84' and second pair of stators 86 and 86', respectively. The first and second turbine rotors 126 and 128 are fixedly connected to the output shaft 42 via hubs 127 and 158 and having its terminal end supported by a bearing 120 carried by a bearing support member 118, which is fixedly supported by a frame 116 connected to the turbine housing 72. The first and second turbine rotors 126 and 128 also have axial flow fans 140 and 157 to force the expanded gases to the outlets 40c and 44c, respectively.

Figure 5:
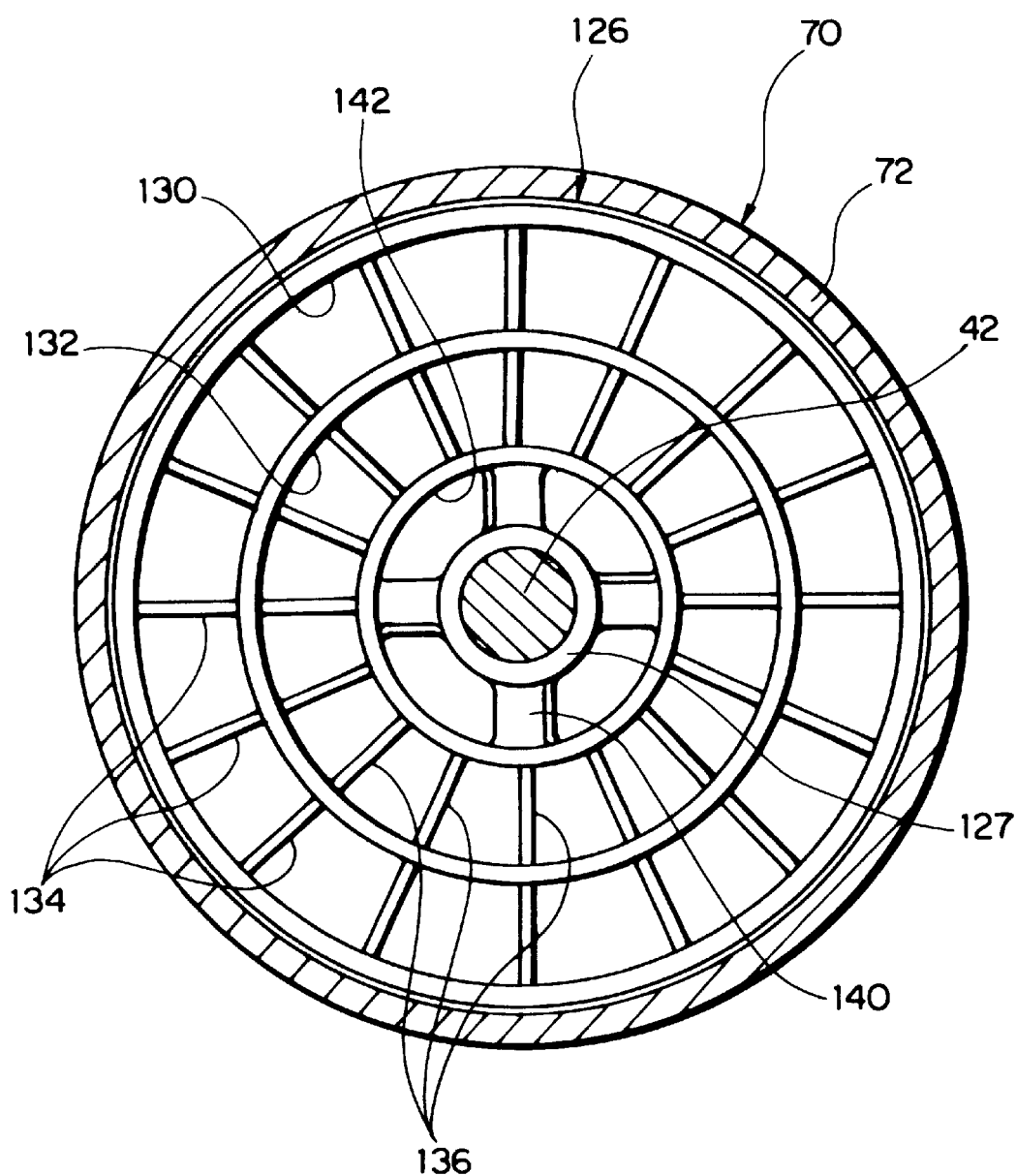
FIG. 5 is a plan view of a turbine rotor taken on line V—V of FIG. 3.
Figure 6:
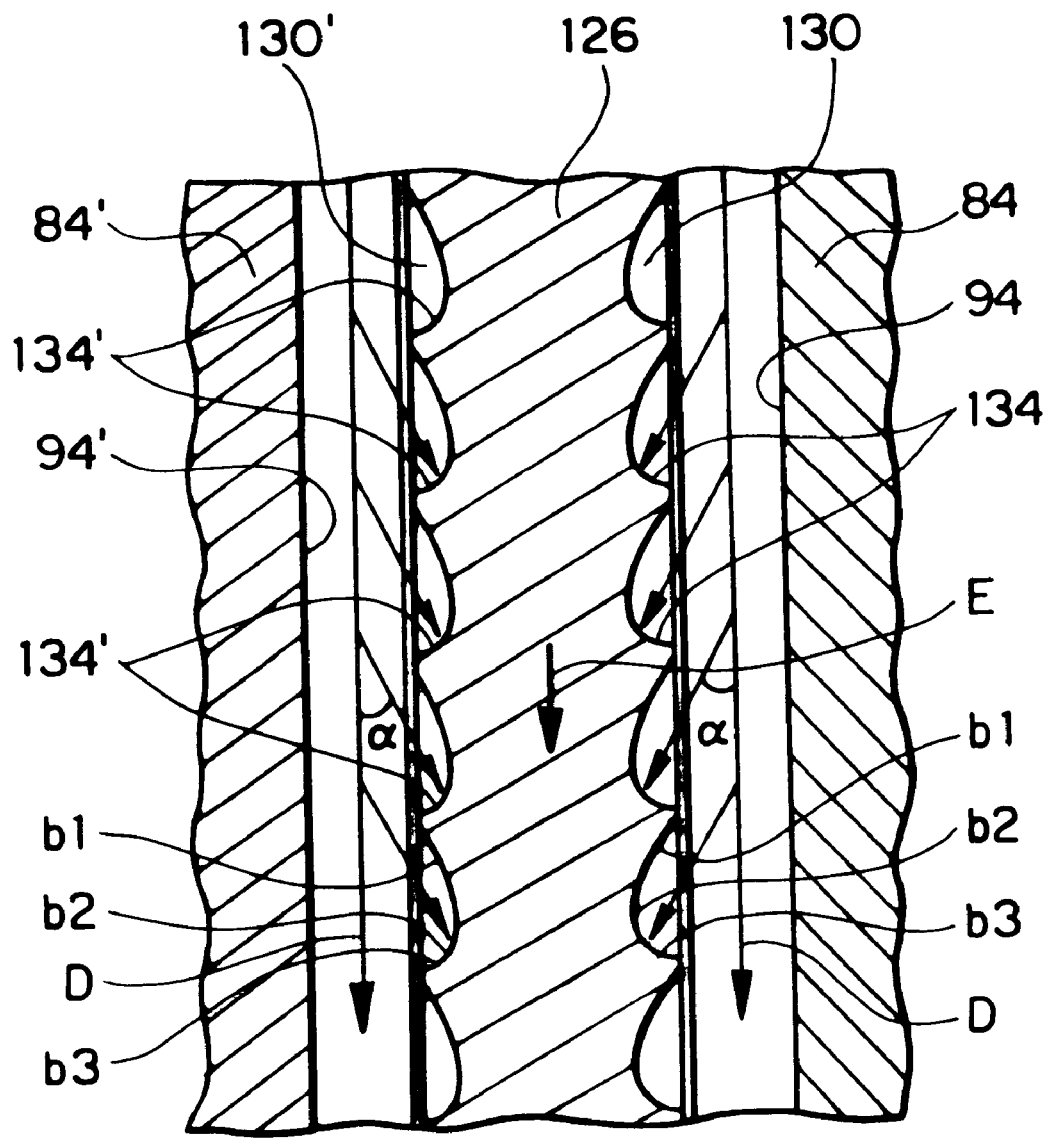
FIG. 6 is a schematic view showing the relationship between the stator and the turbine rotor.

In FIGS. 3, 5 and 6, the first turbine rotor 126 has its both radial surfaces each formed with outer and inner annular guide recesses 130, 130' and 132, 132' which are concentric with each other. The outer and inner guide recesses 130, 130' and 132, 132' serve as first and second expansion stages, respectively, which have pluralities of circumferentially spaced turbine blades 134, 134' and 136, 136', respectively. As shown in FIG. 6, each of the turbine blades has an inlet surface b1 axially extending inward from the radial surface of the turbine rotor 126 at an angle along inlet fluid angle α of the jet stream A, an intermediate surface b2 to which the jet stream impinges, and an outlet surface b3 extending from the intermediate surface b2 in such a direction as to intersect the jet stream A and terminating at the radial surface of the turbine rotor 126. Since each of the turbine blades is surrounded by outer and inner peripheries of each guide recess, the turbine blades provide cavities, respectively, to allow the jet stream to expand therein. The expanded jet stream impinges on the intermediate surface b2 of the turbine blade 126 to give a torque on the turbine rotor 126. The expanded jet stream then comes out of the radial surface of the turbine rotor 126 and joins the jet stream D. In this manner, the jet streams D flowing through the annular flow passages 94, 94' and 96, 96' partially expand in the turbine blades 134, 134' and 136, 136' at both sides of the turbine rotor 126, the turbine rotor 126 is driven with a large torque. Similarly, the second turbine rotor 128 also has its one radial surface formed with annular guide recess 150 and 152 and pluralities of turbine blades 154 and 156, which face the annular flow passages 108 and 110 of the stator 86. The second turbine rotor 128 is fixedly supported by the output shaft 42 by means of the hub 158. The second turbine rotor 128 has its another radial surface formed with annular guide recesses 150' and 152' and pluralities of turbine blades 154' and 156', which face the annular flow passages 108' and 110' of the stator 86'. Each of the turbine blades of the turbine rotor 126 has the same shape as that shown in FIG. 6.

In FIGS. 3 to 6, the high speed jet stream D leaving the nozzle 74 flows through the first annular flow passages 94 and 94'. As shown in FIG. 6, the jet stream D entering the annular flow passages 94 and 94' is expanded to flow along the inlet surfaces b1 and impinges upon the intermediate surfaces b2. Then, the expanded jet stream comes out from the outlet surface b3 to join the main stream D. Thus, during circular movement of the jet stream D on the radial surfaces of the stator 84 and 84', the jet stream D repetitively impinges upon the turbine blades 134 and 134' of the turbine rotor 126. In this manner, the first and second turbine rotors 126 and 128 are applied with a large torque by the action of the high speed circular jet streams entering from the injection nozzles 74, 74', 76 and 76', respectively.

Turning now to FIG. 3, the output shaft 42 is shown as having a labyrinth packing 42b formed on a sleeve 42a fixed to the output shaft. A minimum distance is provided between the outer periphery of the labyrinth packing and an adjacent wall of central openings 80a and 80b of the solid disk 80, thereby preventing leakage of the expanded gases between the first and second power turbines 40 and 44.

Figure 7:
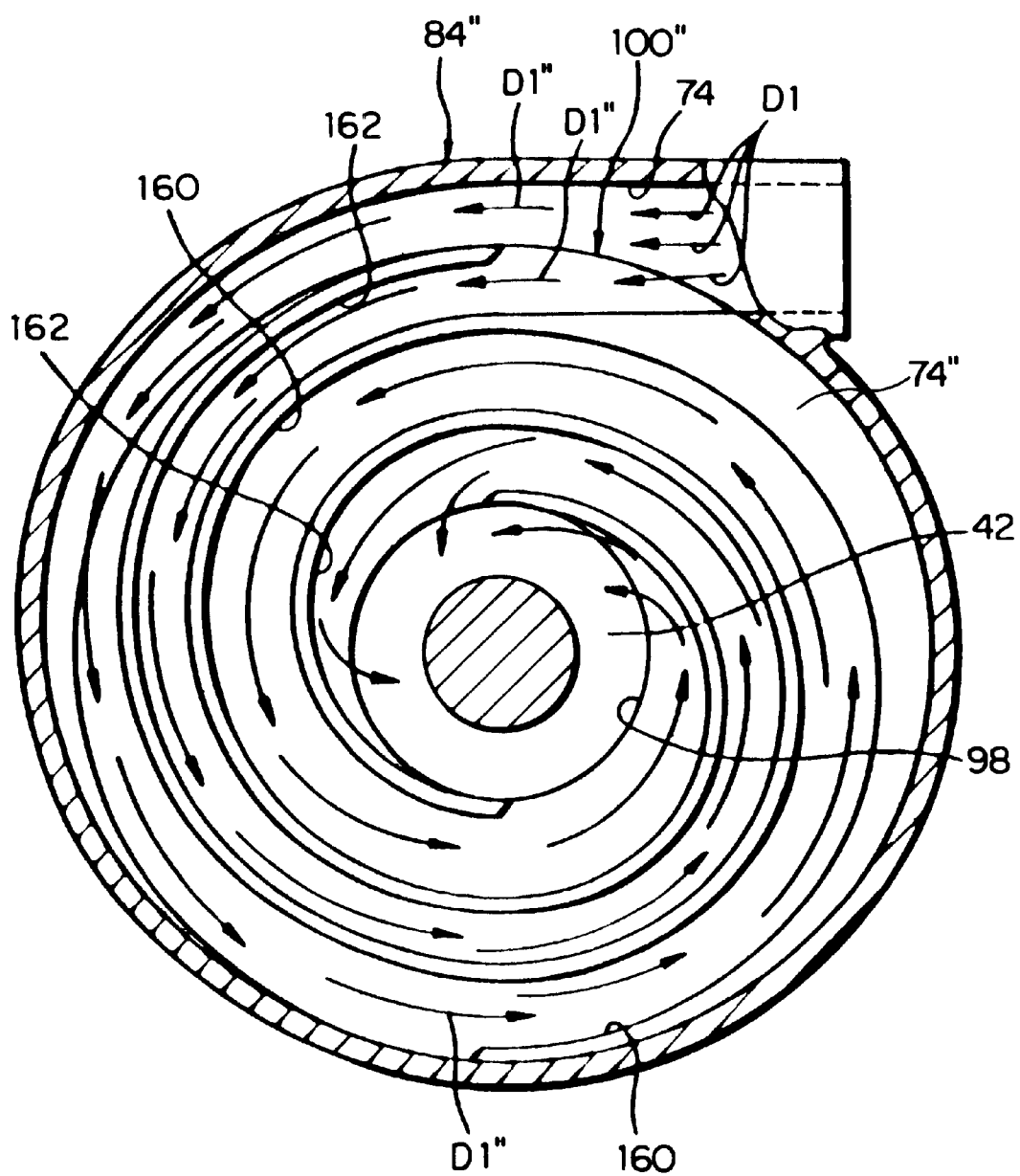
FIG. 7 is a schematic view of a modification of the stator.
Figure 8:
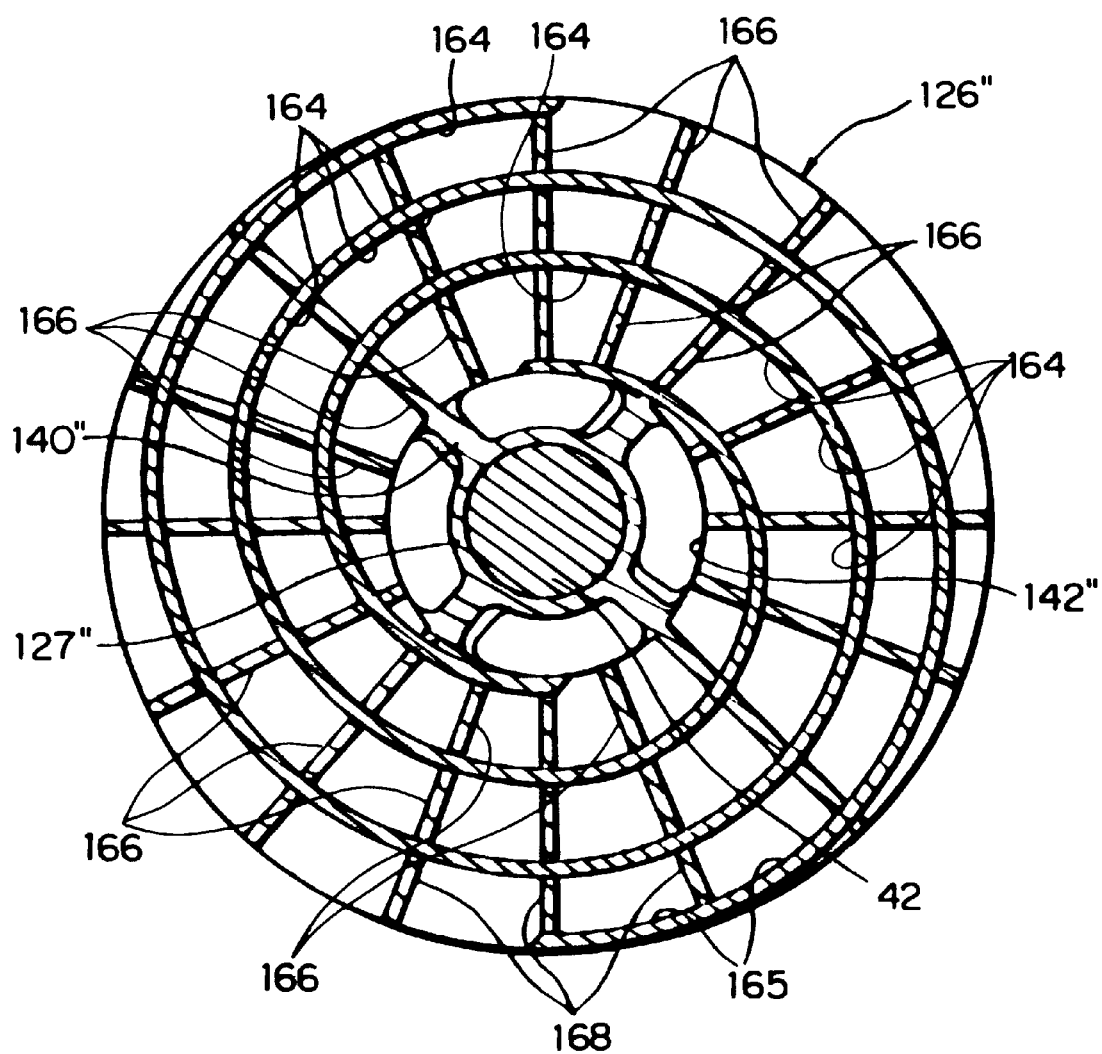
FIG. 8 is a schematic view of a modified form of the turbine rotor.

FIGS. 7 and 8 show modified forms of the stator and the turbine rotor, with like elements being assigned with like reference numerals as those used in FIGS. 4 and 5 with an exception that double apostrophes are given to the reference numerals. The stator 84" comprises a high speed jet stream generation means 100" composed of first and second spiral flow passages 160 and 162 formed on the radial surface of the stator 84 and communicating with the injection nozzle 74 and the central opening 98. Thus, the jet stream generation means 100" generates first and second spiral jet streams on the radial surface of the stator 84. On the other hand, the turbine rotor 126" comprises a rotor disk having its radial surfaces each formed with first and second spiral guide recesses 164 and 165 and first and second turbine blades 166 and 168 formed in the first and second spiral guide recesses 164 and 165, respectively. The first and second rotor blades 166 and 168 are circumferentially spaced from one another and radial extend as shown in FIG. 8. In a preferred embodiment, the first and second spiral guide recesses 164 and 165 have the same track as the spiral flow passages 160 and 162 of the stator 84" respectively.

The turbine rotor 126" has an axial fan 140" and a hub 127" fixed to the output shaft 42.

The turbine rotor 126" is disposed in the turbine housing in opposed relationship to the stator 84" in a manner as shown in FIG. 3. In a modified form, each of the first and second power turbines 40 and 44 may comprise the stator including the spiral jet stream generation means shown in FIG. 7 and the turbine rotor including spiral guide recesses and turbine blades formed therein as shown in FIG. 8. With this construction, the first and second high speed jet streams D1" flow into the first and second spiral flow passages 160 and 162, thereby generating the first and second high speed spiral jet streams on the radial surface of the stator 84". The jet streams impinge upon the turbine blades 166 and 168 and, so, the turbine rotor 126" is rotated. In this instance, the spiral guide recesses 164 and 165 of the turbine rotor 126" are displaced from the corresponding spiral flow passages 162 and 160 of the stator 84". Then, the spiral jet streams eject in a tangential direction from the spiral flow passages 162 and 160 into the spiral guide recesses 164 and 165 which guide the spiral jet streams toward the turbine blades 166 and 168. Thus, the spiral jet streams simultaneously impinge upon the turbine blades 166 and 168 at many acting points and, therefore, the turbine rotor 126" is driven with a large torque at a relatively low speed. All of the radial surfaces of the first and second turbine rotors are applied with tangential drive forces at many locations by the action of the spiral jet streams generated on the stators.

The present invention may be embodied in other specific forms without departing from the spirit or essential attributes thereof and, accordingly, reference should be made to the appended claims, rather than to the foregoing specification, as indicating the scope of the invention.

What is claimed is:

1. A stem-augmented engine system, comprising:

compressor means for receiving air and discharging a first compressed air flow mass;

first direct contact steam generation combustor means composed of a compressed air intake chamber, a direct contact steam generation section for receiving feed water to generate steam, and a combustion chamber for receiving said first compressed air flow mass, fuel and said steam to generate first high pressure and temperature working fluid composed of combined steam and combustion products;

first expansion means for receiving and expanding said first working fluid to generate a first power output for powering said compressor means and for discharging an expanded combustion product;

second direct contact steam generation combustor means for receiving said product, fuel and feed water for generating second high pressure and temperature working fluid composed of combined steam and combustion product;

second expansion means for receiving and expanding said second working fluid to generate a second power output and for discharging an exhaust product;

heat recovery evaporator means for recovering heat from said exhaust product to generate a third high pressure working fluid from a combined organic mixture having a low boiling point;

third expansion means for receiving and expanding said third working fluid to generate a third power output and discharging an expanded product;

condensor means for receiving said expanded product and condensing the same to produce a liquid of said combined organic mixture;

a first feed pump for feeding said liquid under pressure to said evaporator means;

regenerator means connected between said evaporator means and said first feed pump for receiving said exhaust product whereby said liquid is preheated while the steam contained in said exhaust product is condensed to provide feed water so that dry exhaust product is rejected from said regenerator means to atmosphere; and a second feed pump for feeding said feed water under pressure to said first and second combustor means.

2. A system according to claim 1, in which said combined organic mixture is composed of 5 to 25 weight percentage of ammonium and 75 to 95 weight percentage of methanol.

3. A system according to claims 1 or 2, in which said compressor means comprises first and second compressors driven by said first expansion means, and further comprising intercooler means disposed between said first and second compressors for receiving said feed water from said second feed pump to effect cooling between said first and second compressors.

4. A system according to claims 1 or 2, in which said second and third expansion means are connected to a common output shaft.

5. A gas turbine power plant, comprising:

compressor means for receiving air and discharging a compressed air flow mass;

first combustor means for receiving said compressed air flow mass, fuel and feed water to generate a first working fluid composed of combined steam and combustion products;

a compressor turbine driven by said first working fluid to generate a first power output for powering said compressor and discharging an expanded combustion product;

second combustor means for receiving said expanded combustion product, fuel and feed water for generating a second working fluid composed of combined steam and combustion product;

a first expansion turbine driven by said second working fluid to generate a second power output and discharging an exhaust product;

a heat recovery evaporator connected to said first expansion turbine for recovering heat from said exhaust product to generate a third working fluid from a combined organic mixture having a low boiling point;

a second expansion turbine driven by said third working fluid to generate a third power output and discharging an expanded product;

condensor means for condensing said expanded product to provide a condensed liquid of said combined organic mixture;

a first feed pump for feeding said condensed liquid under pressure to said evaporator means; and a second feed pump for supplying feed water under pressure to said first and second combustor means.

6. A power plant according to claim 5, further comprising regenerator means connected between said first feed pump and said heat recovery evaporator for converting said exhaust product to said feed water to be supplied to said second feed pump and a dry exhaust product to be rejected to atmosphere.

7. A power plant according to claims 5 or 6, in which said combined organic mixture is composed of methanol containing 12 weight percentage of ammonium.

8. A power plant according to claims 5 or 6, in which each of said first and second combustor means comprises a compressed air intake chamber, a direct contact steam generating section including a plurality of feed water spray nozzles and a combustion chamber communicating with said compressed air intake chamber and said direct contact steam generating section.

9. A power plant according to claim 6, in which said compressor means comprises first and second compressors driven by said compressor turbine, and further comprising intercooler means connected between said first and second compressors for cooling compressed air leaving said first compressor, said intercooler means receiving said feed water supplied by said second feed pump and preheating said feed water before it is delivered to said first and second combustor means.

10. A power plant according to claims 5 or 6, in which said first and second expansion turbines are composed of a hybrid gas turbine including a turbine housing and an output shaft rotatably supported by said turbine housing, each of said first and second expansion turbines comprises stator means fixedly supported by said turbine housing and a turbine rotor carried by said output shaft and rotatably disposed in said turbine housing in opposed relationship to said stator means, said stator means including high speed jet stream generation means for generating at least one jet stream on a radial surface of said stator means, and said turbine rotor including a plurality of circumferentially spaced turbine blades which face said high speed jet stream generation means.

11. A power plant according to claims 5 or 6, in which each of said first and second expansion turbines comprises a turbine housing having nozzle means, stator means fixed in said turbine housing, and a turbine rotor rotatably disposed in said turbine housing in opposed relationship to said stator means, said stator means having its radial surface formed with jet stream generation means, and said turbine rotor having its radial surface formed with a plurality of turbine blades which face said jet stream generation means.

12. A gas turbine engine, comprising:

compressor means for receiving air and discharging a compressed air flow mass;

first combustor means including direct contact steam generation means for generating high pressure steam from feed water, and combustion means for receiving said compressed air flow mass, fuel and said steam to generate a first working fluid composed of combined steam and combustion product;

first expansion means for receiving and expanding said first working fluid to generate a first power output for powering said compressor means and for discharging an expanded combustion product;

second combustor means including direct contact steam generation means for generating second high pressure steam from said feed water, and combustion means for receiving said expanded combustion product, fuel and said second steam to generate a second working fluid composed of combined steam and combustion product;

second expansion means for receiving said second working fluid and expanding said second working fluid to generate a second power output and for discharging an exhaust product;

heat recovery evaporator means for recovering heat from said exhaust product and receiving an organic mixture liquid having a low boiling point to generate a third working fluid;

third expansion means for receiving and expanding said third working fluid to generate a third power output and discharging an expanded organic mixture;

condensor means for receiving and condensing said expanded organic mixture to provide said organic mixture liquid;

a first feed pump for feeding said feed water under pressure to said first and second combustor means; and a second feed pump for feeding said organic mixture liquid under pressure to said heat recovery evaporator means, each of said second and third expansion means including stator means having its radial surface formed with jet stream generation means, and a turbine rotor rotatably disposed in opposed relationship to said stator means, said turbine rotor having its radial surface formed with a plurality of turbine blades facing said jet stream generation means.

13. An engine according to claim 12, further comprising regenerator means disposed between said heat recovery evaporator means and said first feed pump and receiving said exhaust product leaving said heat recovery evaporator means for condensing said exhaust product to provide said feed water to be fed to said first feed pump and dry exhaust gas to be rejected to atmosphere.

14. An engine according to claims 12 or 13, in which organic mixture liquid is composed of 5 to 25 weight percentage of ammonium and 75 to 95 weight percentage of methanol.

* * * * *